United States Patent [19]

Smith

[11] 4,422,338

[45] Dec. 27, 1983

[54] METHOD AND APPARATUS FOR MASS FLOW MEASUREMENT

[75] Inventor: James E. Smith, Boulder, Colo.

[73] Assignee: Micro Motion, Inc., Boulder, Colo.

[21] Appl. No.: 280,297

[22] Filed: Jul. 6, 1981

Related U.S. Application Data

[63] Continuation-in-part of Ser. No. 235,268, Feb. 17, 1981, abandoned.

[51] Int. Cl.³ .............................................. G01F 1/84
[52] U.S. Cl. ................................................. 73/861.38
[58] Field of Search ..................................... 73/861.38

[56]         References Cited
         U.S. PATENT DOCUMENTS

| | | |
|---|---|---|
| 2,865,201 | 12/1958 | Roth . |
| 3,087,325 | 4/1963 | Roth . |
| 3,108,475 | 10/1963 | Henderson . |
| 3,132,512 | 5/1964 | Roth . |
| 3,276,257 | 10/1966 | Roth . |
| 3,329,019 | 7/1967 | Sipin . |
| 3,355,944 | 12/1967 | Sipin . |
| 3,485,098 | 12/1969 | Sipin . |
| 4,187,721 | 2/1980 | Smith . |
| 4,192,184 | 3/1980 | Cox et al. ........................ 73/861.38 |
| 4,311,054 | 6/1982 | Cox et al. ........................ 73/861.38 |

OTHER PUBLICATIONS

Micro Motion Inc., Instruction Manual–Model B Mass Flow Meter.
Halliday et al., "Physics for Student of Science and Education", Published by Wiley and Sons Inc., 1962.

*Primary Examiner*—Herbert Goldstein
*Attorney, Agent, or Firm*—Irons & Sears

[57]            ABSTRACT

Apparatus and method for making fluid mass flow rate measurements using a Coriolis flow meter equipped with sensors which measure acceleration, velocity, or position of each side leg of an oscillating U-shaped conduit through which the fluid is passed. The sensors are so constructed and located as to produce analog signal outputs which accurately correspond to the motion of the respective side legs of the U-shaped conduit. When fluid is flowing through the conduit, a change from coincidence in the time relationship of the sensor signals caused by the divergent oscillations of each side leg of the U-shaped conduit is measured in both directions of oscillation. The fluid mass flow rate is then determined as a function of such time separation of the signals. The separation of the two signals with respect to time is measured without reference to static structures affixed to a platform.

27 Claims, 9 Drawing Figures

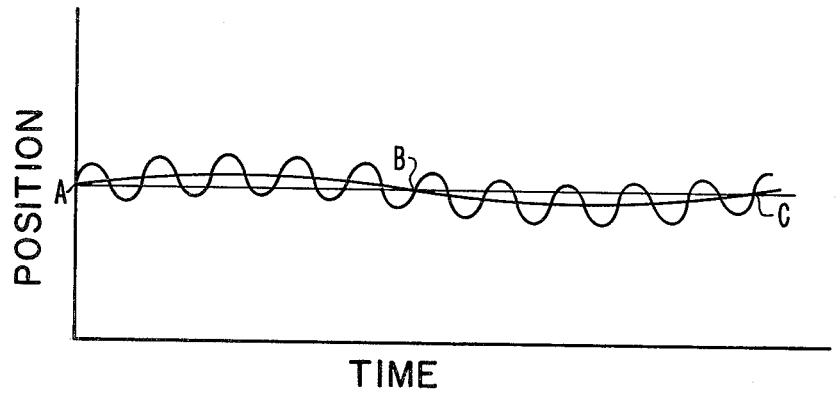
Fig_2
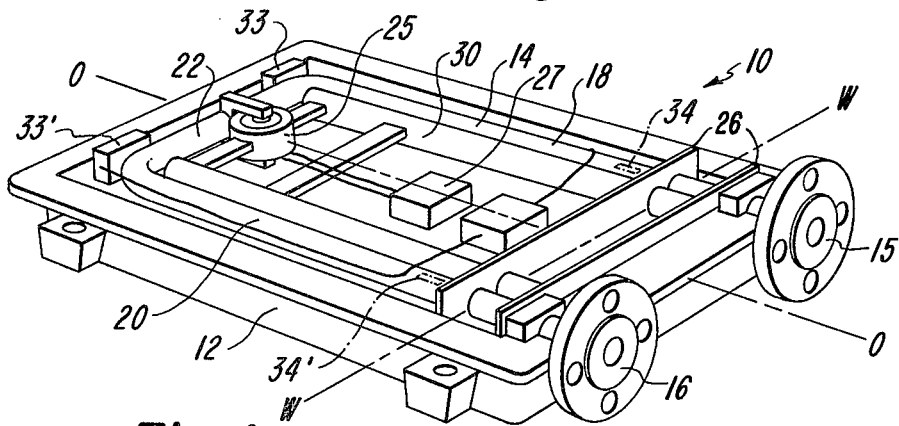
Fig_1
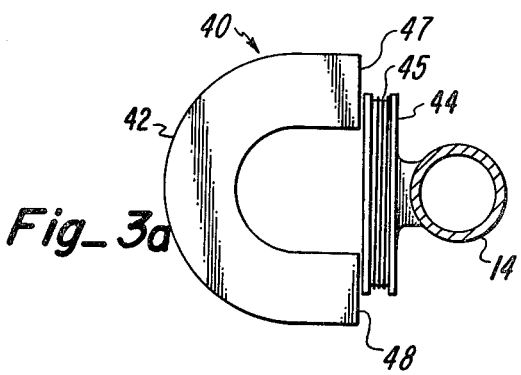
Fig_3a
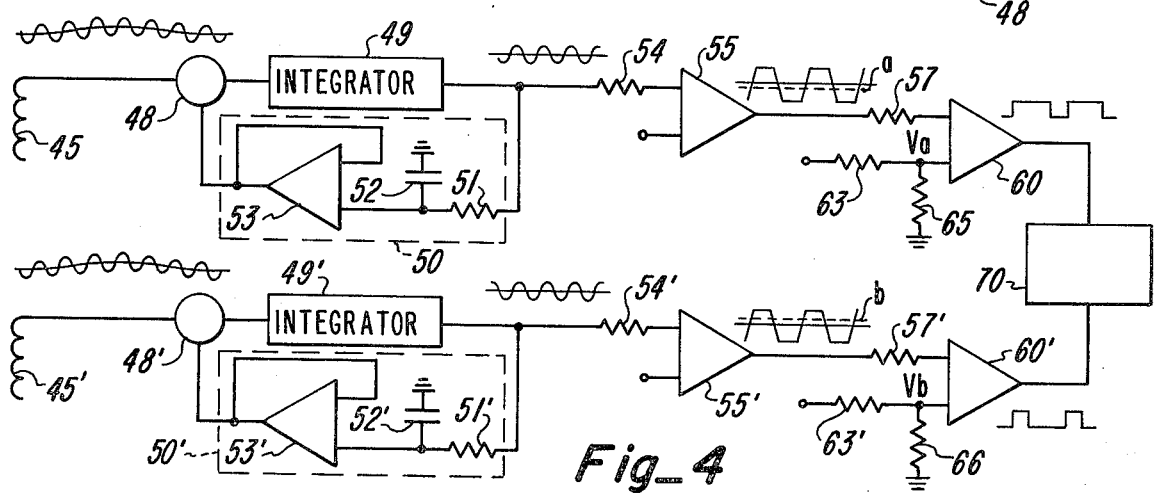
Fig_4

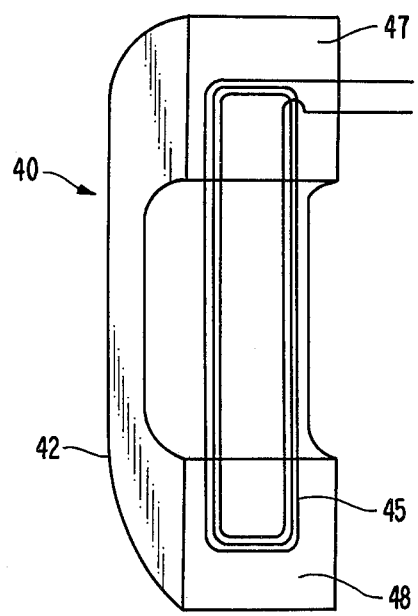
FIG_3b

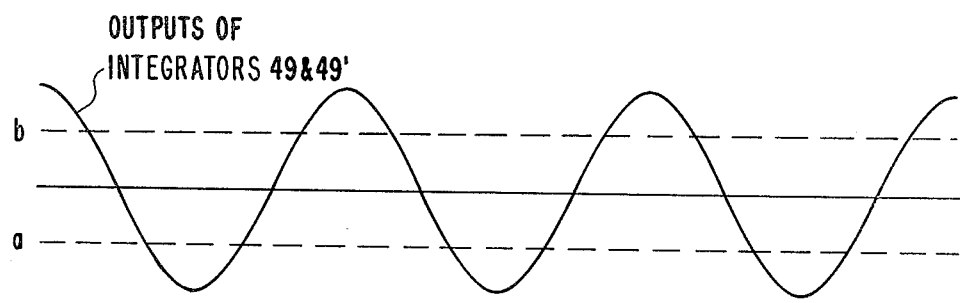
*Fig_5*
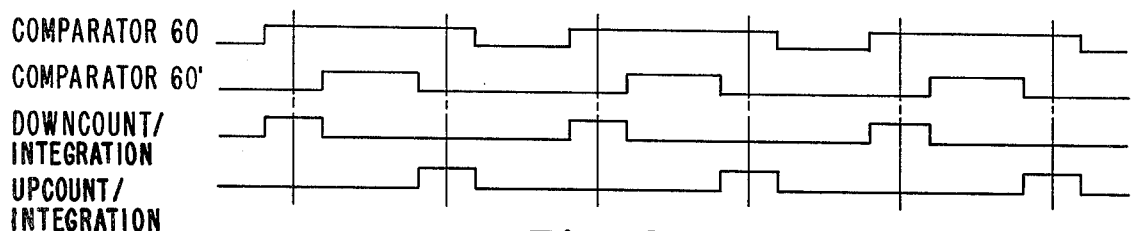
*Fig_6*
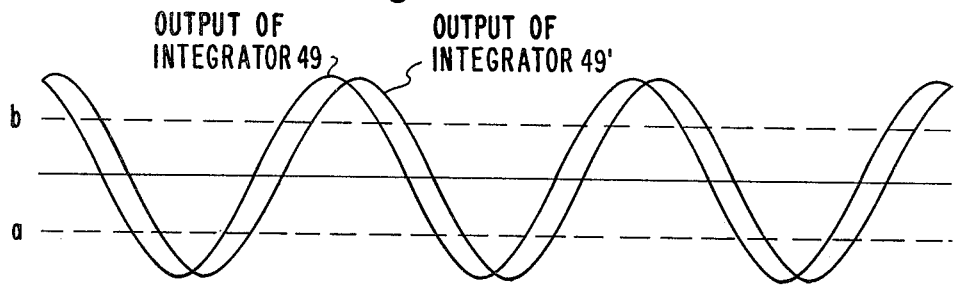
*Fig_7*
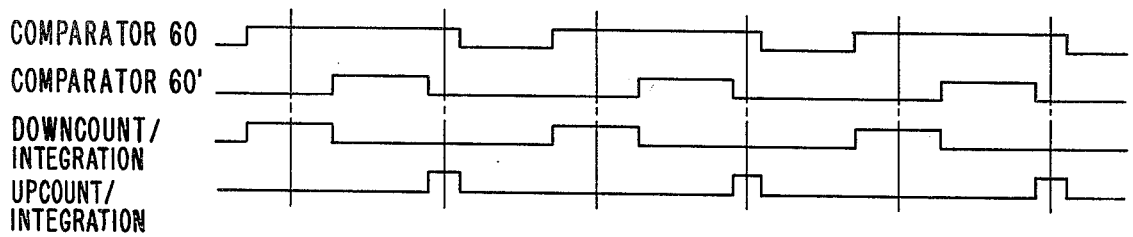
*Fig_8*

METHOD AND APPARATUS FOR MASS FLOW MEASUREMENT

This application is a continuation-in-part of application Ser. No. 235,268, of James E. Smith filed Feb. 17, 1981, now abandoned.

BACKGROUND OF THE INVENTION

1. Field of the Invention

The present invention relates generally to flow measuring devices and methods utilizing curved, including U-shaped conduits solidly mounted in beamlike, cantilevered fashion, and more particularly to a sensor and circuitry arrangement utilized with such flow measuring devices to substantially enhance the accuracy, stability and versatility of such devices.

SUMMARY OF THE INVENTION

The present invention, which provides a heretofore unavailable improvement over known mass flow measuring concepts, comprises a sensor and circuitry arrangement for use with continuous, curved, preferably U-shaped tubes mounted in beamlike fashion as described in U.S. Pat. No. 4,187,721. The present sensors provide for accurate determination of Coriolis forces by outputting analog signals. This is in contrast to the sensors previously employed which outputted digital signals referenced to physical structures attached to the flow meter's mounting platform, which digital signals were therefore, essentially referenced to "static" structures with respect to the oscillating conduit over time periods of the order of a cycle. Avoiding such digital reference to "static" physical structures eliminates the need for manual compensation necessitated by variations in the physical characteristics of the meter's structure and its curved conduit caused by fluctuations in the ambient conditions, e.g., temperature, fluid flow pressure, etc.

Preferably, according to the present invention, velocity sensors are employed, though acceleration and position sensors are also workable. Rather than utilizing the velocity sensors to determine the magnitude of the Coriolis forces as a function of the magnitude of the conduit velocity, the instant invention employs the velocity (or other) sensors to generate signals accurately corresponding to travel of the oscillating side legs of the curved conduit so that the time delay, caused by mass flow induced Coriolis forces, between the movement of the two legs of the oscillating conduit can be determined. As will be apparent from the following discussion, this technique for analog measurement of the conduit movement as a function of velocity, acceleration or position is dynamic, i.e., without digital reference to a discrete physical structure that is "static" with respect to the oscillating conduit. Therefore, the analog measurement is independent of long term structural fluctuations caused by changqs in ambient conditions which have necessitated compensation in the position of the discrete "static" structures when operating Coriolis flow meters such as e.g., that shown in FIG. 1 of U.S. Pat. No. 4,187,721. For the preferred velocity sensor this independence results from the fact that ambient induced warpage of the meter's structure is substantially smaller than the magnitude of the physical references for the sensor. These physical references are the volumetric extent of a uniform magnetic flux field used by the sensor and the conduit-induced velocity of a wire coil relative to the uniform magnetic flux field. In a preferred embodiment, each sensor signal is integrated at least once, and preferably a plurality of times, with each integrator's output returned to the integrator's input via a low frequency negative feedback circuit. This preferred embodiment minimizes sensitivity to outside vibrations which induce harmonics in sensor output signals, cancels drift generated by the integrator circuit without affecting the phase of the sensor signal, and eliminates low frequency components in the sensor output signals, i.e., lower than the oscillation frequency at which the conduit is driven.

Accordingly, it is an object of the present invention to provide an improved apparatus and method for accurately measuring mass flow rate which is dependent on dynamic and not on "static" reference to a mechanical structure affixed to the flow meter's mounting platform, and which inherently compensates for structural fluctuations caused by changing ambient conditions.

Another object of the present invention is to provide an improved apparatus and method for accurately measuring mass flow rate which is insensitive to vibrations transmitted through the flow meter's structure such that the sensor output signals are affected.

Still another object of the present invention is to provide an improved apparatus and method for measuring mass flow rate which is substantially insensitive to environmental influences, such as temperature and fluid pressure.

Yet another object of the present invention is to provide an improved apparatus and method for measuring mass flow rate which may be operated in an explosive atmosphere.

These and other objects and features of the present invention will be apparent from the following description and illustrative drawings.

BRIEF DESCRIPTION OF THE DRAWINGS

In the drawings

FIG. 1 is a perspective view of a mass flow meter according to the present invention;

FIG. 2 is a graphical representation of the movement of a typical oscillating conduit;

FIG. 3a is a detailed view of the preferred magnet-coil sensor structure of the flow meter of FIG. 1 which depicts an arrangement with respect to the oscillating conduit which will be understood by those skilled in the art as only one of many acceptable arrangements;

FIG. 3b is a detailed view of the same preferred magnet-coil velocity sensor arrangement of FIG. 3a, showing the preferred physical size relationship between the coil and the pole faces of the magnet which those skilled in the art will readily understand, insures coil envelopment in a uniform magnetic flux field independent of both conduit oscillatory motion and long term conduit distortion due to ambient fluctuations;

FIG. 4 is an electronic circuit diagram of the circuit employed with the sensor as illustrated in FIGS. 3a and 3b;

FIG. 5 is a graphical representation of the substantially identical signals illustrated in FIG. 2, after compensation for external error signals, ideally generated by the two sensors of the flow meter under no flow conditions;

FIG. 6 is a timing diagram of the readout signals of the flow meter corresponding to the sensor output of FIG. 5;

FIG. 7 is a view similar to that of FIG. 5 illustrating the sensor signals under a flow condition; and FIG. 8 is a timing diagram of the readout signals of the flow meter corresponding to the sensor output of FIG. 7.

DETAILED DESCRIPTION OF THE INVENTION

Turning now to the drawings, wherein like components are designated by like reference numerals throughout the various figures, a flow meter device according to a preferred embodiment of the present invention is illustrated in FIG. 1 and generally designated by reference numeral 10. In many respects, flow meter 10 is similar to that described in U.S. Pat. No. 4,187,721, the teachings of which are hereby incorporated by reference. Of those teachings the following features of flow meter 10 shown in FIG. 1 are of particular relevance. Flow meter 10, includes mounting platform 12 to which a U-shaped conduit 14, free of pressure sensitive joints, is mounted by means of conduit support structure 26 adjacent the inlet 15 and the outlet 16 ports in a cantilevered fashion for rotational oscillation. Side legs 18 and 20, as well as transverse connecting portion 22 extending therebetween are provided. Preferably, drive mechanism 25, conventionally in the form of a magnet and coil is carried on U-shaped conduit 14 and oscillating member 30, and activated by conventional drive circuit 27, to rotationally oscillate U-shaped conduit 14 about axis W-W, with resulting Coriolis force deflection of U-shaped conduit 14 being about axis O-O. Oscillating member 30 may take several forms, i.e., a single leaf spring, a "V" member mounted at the wide end, or a rectangular structure as illustrated. What is of significance is that the oscillating member 30 have substantially the same resonant frequency as the U-shaped conduit 14 has when filled with fluid in the same density range as that of the fluid whose mass flow rate is to be determined, and that the two be mounted so as to be configured as a tuning fork. Accordingly, the U-shaped conduit 14 and the oscillating member 30 are driven by the drive mechanism 25 at their common resonant frequency. Also taught by U.S. Pat. No. 4,187,721 is that the resonant frequency of oscillation for U-shaped conduit 14 about axis W-W should be lower than the resonant frequency of oscillation about axis O-O. This relationship insures that the predominant force opposing the Coriolis force couple is the resilient spring distortion of the U-shaped conduit 14 about the O-O axis and thus obviates the need for, and the complication of, measuring velocity drag restorative forces and inertial opposing forces.

In the present invention signals from sensors 33 and 33', or 34 and 34', provide a linear analog signal accurately describing the oscillatory motion of the U-shaped conduit 14. This is unlike previous embodiments, as shown in U.S. Pat. No. 4,187,721, in which deflection of U-shaped conduit 14 was measured by digitally sensing the passage of a fixed mechanical structure relative to the oscillating conduit at predetermined points located near the mid-plane of oscillation. In the previous embodiments, by placing sensors on the legs, 18 and 20, of the U-shaped conduit 14 and locating the fixed structure which cooperates with the conduit mounted sensor portion to produce digital signals at points near the mid-plane of oscillation the timing signals produced can be used to determine the time delay between passage of the legs 18 and 20 through the mid-plane of oscillation.

As taught in U.S. Pat. No. 4,187,721, this time delay, when multiplied by constants dependent on the geometry of U-shaped conduit 14, equals the fluid mass flow rate through the conduit. It is the purpose of the present invention to utilize this same teaching but to determine the time delay of passage of the legs 18 and 20 by a unique method which increases accuracy.

The signal outputs of sensors 33 and 33', or 34 and 34', will be better appreciated with reference to FIG. 2. As shown, the position of U-shaped conduit 14 is plotted as the ordinate and time as the abscissa. Under ideal conditions, and particularly as contemplated by U.S. Pat. No. 4,187,721, "static" midpoint line A-C would constitute oscillation about the mid-plane. However, under a range of operating conditions which include temperature changes of the fluid flowing through U-shaped conduit 14, fluid pressure changes, vibration of mounting platform 12, etc., the actual oscillation of U-shaped conduit 14 typically occurs about a changing midpoint as illustrated by the curved line. For instance, when subjected to temperature excursions first in an elevated direction and then in a lowered direction, actual symmetrical oscillation about the nominal static midpoint occurs only at points A, B and C. While actual oscillation would remain symmetrical about the curved line, which is exaggerated for purposes of illustration, it will be seen that the nominal midpoint of oscillation in fact deviates from the actual midpoint under such conditions.

In order to avoid the need for recalibration in response to midpoint drift as a result of such excursions of the midpoint of oscillation as illustrated in FIG. 2, flow meter 10 as illustrated in FIG. 1 utilizes sensors which generate an analog signal that is substantially a linear function of the actual oscillation of U-shaped conduit 14 as opposed to a digital signal referenced to a structure affixed to the meter's mounting platform. In the case of sensors 33 and 33', acceleration or velocity sensors are operable, though velocity sensors are preferred. In the instances of sensors 34 and 34', analog position sensors—not to be confused with the digital nominal midpoint position sensors of U.S. Pat. No. 4,187,721—such as strain guages are provided. Acceleration and velocity sensors are preferably spaced from axis W-W at connecting portion 22 since these parameters are greatest at such location. Sensors 33 and 33' may also be, and preferably are, located on the outside edges of side legs 18 and 20 rather than on connecting portion 22 as shown in FIG. 1. On the other hand, strain of U-shaped conduit 14, as a function of the position of connecting portion 22, is greatest adjacent the mounting of U-shaped conduit 14, and accordingly sensors 34 and 34' are mounted adjacent to, but preferably spaced somewhat from, the solid mounting of U-shaped conduit 14. It will be understood of course, that the analog signals generated by a position sensor and an acceleration sensor will be 180° out of phase and similar in wave form. The analog signal generated by a velocity sensor will be similar in wave form to that of the acceleration signals, but 90° displaced from such signals.

For the purpose of the following discussions, the preferred embodiment of a velocity sensor, as illustrated in FIGS. 3a and 3b, will be specifically addressed, but with the understanding that sensors generating position or acceleration signals are substantially equivalent. With reference to FIG. 3a, velocity sensor 40 is illustrated and includes a magnet, preferably a permanent magnet, 42 mounted in a fixed manner to mounting platform 12 and a bobbin 44 mounted to U-shaped conduit 14 which carries a coil 45. With reference to FIG. 3b, the windings of the coil are adjacent each pole at faces 47 and 48 of magnet 42 such that the coil, except for those straight sections of the coil windings interconnecting the ends at the pole faces, is always in a uniform magnetic flux field. Bobbin 44 is substantially rectangular in shape. U-shaped conduit 14, as illustrated in FIG. 3a, reciprocates in a vertical direction. Accordingly, the horizontal windings at the upper and lower portions of coil 45 move orthogonally through a substantially uniform magnetic flux field of magnet 42 thus inducing a potential in coil 45 which is a linear function of the velocity of coil 45 relative to adjacent magnet 42. The pole faces 47 and 48 of magnet 42 are preferably spaced a sufficient distance from each other such that the magnetic flux at each of the faces 47 and 48 is normal to the surface thereof. Magnet 42 is configured such that faces 47 and 48 are of a dimension greater than the greatest oscillation of U-shaped conduit 14 thereby insuring that the upper and lower portions of coil 45 will be maintained in a uniform magnetic flux field. Preferably faces 47 and 48 are positioned so as to stabilize the gaps relative to coil 45 during oscillation and deflection of U-shaped conduit 14. Of course magnet 42 may alternatively be mounted on U-shaped conduit 14 and bobbin 44 may be fixedly mounted relative to the coil if desired.

Turning now to FIG. 4, wherein parallel sensor circuits—one labeled with a prime—are shown, a pair of coils 45 and 45', already described with regard to velocity sensors 40 are illustrated. It will be recognized that the output signals from such coils 45 and 45' are substantially in the form of waves incorporating frequency components made up of those resulting from conduit oscillation driven by mechanism 25, mass flow rate induced Coriolis forces, and those which result from frequency variations in the oscillation caused by ambient sources such as shock, temperature fluctuations, fluid pressure variations, etc. The output from velocity sensor coils 45 and 45' are provided to summing junctions 48 and 48', and from there to integrators 49 and 49', it being understood that several stages of integration may be provided to reduce sensitivity to external vibrations. The outputs from integrators 49 and 49' in turn are connected to low pass filters 50 and 50' which pass the low frequency components of the signals from velocity sensor coils 45 and 45', and in turn provide feedback in negative quantities to summing junctions 48 and 48'. Filters 50 and 50' include resistors 51 and 51', capacitors 52 and 52' and amplifiers 53 and 53' configured in a conventional arrangement as shown. Thus the low frequency components of the signals from velocity sensors 45 and 45' are in effect substantially cancelled from such signals thereby essentially deleting such components from the outputs of integrators 49 and 49'. The outputs from integrators 49 and 49' are provided through resistors 54 and 54' to amplifiers 55 and 55' which are operated at saturation levels. As is well known, amplifiers 55 and 55' will convert an oscillating wave input to output signals which are clipped waves approximating truncated sawtooth waveforms. Comparators 60 and 60' are each connected at one input thereto to the outputs from amplifiers 55 and 55' through resistors 57 and 57', respectively. The reference input to comparators 60 and 60' are connected to a reference voltage through resistors 63 and 63' and to, for instance, ground through resistors 65 and 66 which are of differing values. Accordingly, reference voltage Va is provided to comparator 60 while reference Vb is provided to comparator 60'. In turn, the output from comparator 60, a square wave, is biased on the "ON" position as a function of voltage Va, i.e., switching to the "OFF" position at the bias line a as illustrated with regard to the output from amplifier 55. By the same means, the output signal from comparator 60' is biased to the "OFF" position, i.e., switching at bias line b again as a function of reference voltage Vb. The biasing is adjusted such that, throughout the dynamic range of flow meter 10, sensor 45 provides a rising waveform from comparator 60 prior to the rising waveform from comparator 60' despite full deflection, i.e., full range flow, through U-shaped conduit 14. The square wave outputs from comparators 60 and 60' are provided to readout circuit 70, which is either the same as that described in U.S. Pat. No. 4,187,721, or that described in published *Instruction Manual Model B Mass Flow Meter*, available from Micro Motion, Inc., 7070 Winchester Circle, Boulder, Colo. 80301. As will be described below, the readout circuit 70 fundamentally constitutes either an up-down counter as described in detail in U.S. Pat. No. 4,187,721 or an analog integrator as described in *Instruction Manual Model B Mass Flow Meter*. Both of these circuit approaches are intended to measure the time delays of the rising and falling portions of the square wave signals from comparators 60 and 60' that are inputted to readout circuit 70.

From FIGS. 1 through 4, and the above discussion, it is apparent that several significant advantages are afforded by the sensors and circuitries described. For generating analog signals which are accurate linear functions of the oscillatory motion of U-shaped conduit 14—rather than digital signals that are dependent on a "static" plane referenced to mounting platform 12—provides an improved means to measure the Coriolis forces producing elastic deflection of the U-shaped conduit. Specifically, sensors 33 and 33', or 34 and 34', provide signals which are linear functions of the actual oscillatory motion of U-shaped conduit 14. Position sensors, such as would be employed as sensors 34 and 34', are preferably strain gauges which vary in electrical characterisitics, typically resistance, as a function of the strains induced in U-shaped conduit 14. Such sensors are preferably mounted adjacent inlet 15 and outlet 16, positions at which the strains are greatest, but spaced somewhat therefrom to avoid influencing the strain as a result of the solid mounting of U-shaped conduit 14 to supports 26. Sensors 33 and 33', mounted at the intersection of legs 18 and 20, and connecting portion 22, are preferably acceleration or velocity sensors. Acceleration sensors are more sensitive to outside vibrations, but this drawback may be avoided by providing several stages of integration before processing the signals for time delay measurements. Such integration is provided through circuits 49 and 49'. The second integral of an acceleration sensor's output is equivalent to the primary output of position sensors 34 and 34', while the first integral of the output of an acceleration sensor is equivalent to the signal from velocity sensor 40. In general, a plurality of stages of integration of the output signals of whichever sensor is employed is preferred, though at extremely high numbers of integration stages, instability may be observed in the circuitry. One skilled in the art will readily recognize the point of diminishing returns in an actual flow meter system.

Velocity sensor 40, illustrated in FIGS. 3a and 3b, appears to provide an economical and most effective device to serve as sensors 33 and 33'. This is more a result of ease of construction, availability and stability of appropriate circuitry components as opposed to theoretical advantage. With one or more stages of integration, at the sensor output, velocity sensor 40 employed in flow meter 10 provides long-term stability over the heretofore most troublesome operating condition, i.e., substantial temperature changes of 200° C. or more of the fluid flowing through the U-shaped conduit 14. Even a direct blast with refrigerants upon U-shaped conduit 14 fails to disrupt the sensitivity and accuracy of flow meter 10 other than for a few cycles thereof. The same conditions seriously disrupt the operation of prior oscillating conduit type Coriolis flow meters.

The operation of flow meter 10 will be more readily understood with reference to the signal and timing chart representations of FIGS. 5 through 8. Discussion of these figures and the description of the operation of readout circuit 70 is facilitated by noting that circuit 70 fundamentally consists of either an up-down counter as described in U.S. Pat. No. 4,187,721, or an analog integrator as described in *Instruction Manual Model B Mass Flow Meter*. Since either the up-down counter or the analog integrator circuit essentially achieve the same purpose, the following discussion of how circuit 70 functions for convenience will not be repeated for the two approaches. Instead the discussion refers to the composite term "counter/integrator", indicating that the functioning as described applies to either.

The outputs of integrators 49 and 49' of FIG. 4, as shown in FIG. 5, after the extraneous frequency components have been cancelled comprise substantially in phase, identical oscillating waves, under no flow conditions. As a result of the differing reference voltages Va and Vb of comparators 60 and 60' respectively, the square wave signals from comparators 60 and 60' to readout circuit 70 are, as illustrated in FIG. 6, at an "ON" level for a longer period with regard to the output from comparator 60 than with regard to the output from comparator 60'. Thus, the down count/integration which is initiated by the rising edge of the signal from comparator 60, and terminated by the rising edge of the signal from comparator 60' is always a positive quantity with the count/integration signal level indicating the time delay between such events. Similarly, the up-count/integration portion of readout circuit 70, which is initiated by the falling edge of the signal from comparator 60', and terminated upon the falling edge of the output of comparator 60, is also always a positive quantity representative of time delay. As discussed above, this relationship is maintained by adjusting the relative magnitude of reference voltages Va and Vb. Under no flow conditions, the counts/integrations, up and down, are identical.

With reference to FIG. 7, it will be seen that the time relationship of the oscillating signals outputted from integrators 49 and 49' is shifted under a flow condition. The relative length of time that the signal from comparator 60 is "ON" does not change, nor does the signal from comparator 60', though the time delay between such changes is shifted as shown in FIG. 8. Accordingly, the period during which a down count/integration is recorded in readout circuit 70 versus the period in which an up count/integration is recorded is dissimilar, with the difference between the down count/integration and up count/integration representing mass flow. Put simply, as shown in FIG. 6, under a no flow condition, the down count/integration and up count/integration produced by readout circuit 70 are the same, since there is no deflection of U-shaped conduit 14 around axis O-O, and readout circuit 70 totaling the down count/integration and up count/integration indicates no flow. On the other hand when a flow condition exists, as shown in FIG. 8, on an up stroke of U-shaped conduit 14, the timing of the square wave signal from comparator 60 is relatively advanced, while that of comparator 60' is retarded, thereby increasing the up count/integration input to readout circuit 70 and decreasing the down count/integration. Mass flow through U-shaped conduit 14 is accordingly a function of the difference in the up and down count/integration as shown in FIG. 8.

Typical components employed in one embodiment of the invention are listed in the following table, though of course numerous other components and values would be operable in equivalent and variant designs.

COMPONENT TABLE

| | |
|---|---|
| Amplifiers 49, 49', 53, 53', 55 and 55' | Motorola type 155 FET Operational Amplifiers |
| Resistors 51 and 51' | 500K ohm, .25 watt CC* |
| Resistors 54 and 54' | 10K ohm, .25 watt CC |
| Resistors 57 and 57' | 1.0K ohm CC |
| Resistors 63 and 63' | 5.6K ohm CC |
| Resistor 65 | 100K ohm CC |
| Resistor 66 | 150K ohm CC |
| Capacitors 52 and 52' | 1 microfarad low leakage |
| Comparators 60 and 60' | National Semiconductor No. LM111 |

*Carbon composition

In summary, the instant invention addresses the problem of frequency variations in the oscillatory travel of a U-shaped conduit as a result of ambient changes in the physical factors affecting such oscillation. By utilizing sensors which generate analog signals as a linear function of the oscillatory movement of the U-shaped conduit, and preferably with circuitry which integrates, filters and cancels the frequency components from the sensor outputs of such oscillation which correspond to physical variations over periods other than that caused by drive mechanism 25, it is possible to provide a stable and accurate mass flow rate meter. In order to minimize sensitivity to external vibrations, it is preferable that the output of the sensors be integrated at least once, whether the signals are from acceleration, velocity or position sensors and particularly in the case of an acceleration sensor through several stages of integration. When signals are generated in such a manner, i.e., with linear reference to the oscillatory movement of the U-shaped conduit, such signals may be readily converted to square wave outputs and monitored for time delays, corresponding to deflections of the side legs of the conduit due to Coriolis forces, to precisely measure the mass flow rate through the flow meter. The latter aspect, i.e., converting time delay changes into square waves, is substantially identical to the conversion into square waves of the signals from the detection and measurement arrangements described in U.S. Pat. No. 4,187,721, and utilized in commercial devices, wherein deflection due to Coriolis forces in a U-shaped conduit is measured digitally by oscillation sensors which detect the mid-plane of oscillation.

The above discussion and related illustrations of the instant invention are directed primarily to preferred embodiments and practices of the invention. However, it is believed that numerous changes and modifications in the actual implementation of the concepts described herein will be apparent to those skilled in the art, and it is contemplated that many such changes and modifications may be made without departing from the scope of the invention as defined by the following claims.

What is claimed is:

1. In a Coriolis force mass flow rate meter including at least one continuous curved conduit solidly mounted at the open ends of leg portions thereof, which conduit is adapted to oscillate about an axis passing substantially through the mounting points of the legs, and further including mass flow rate readout means adapted to indicate mass flow rate as a function of the time delays in each direction of oscillation between the passage of one side leg of the curved conduit through a predetermined point of its oscillation and the passage of the other side leg of said conduit through a corresponding predetermined point of its oscillation, the improvement which comprises:

at least one pair of sensors, one member of each pair being mounted on opposite side legs of the conduit, the sensors being adapted to generate an analog signal linearly representative of the actual oscillatory movement of the sides of the curved conduit at the location of the respective sensor; and means to electronically detect the time delay between the analog sensor signals corresponding to the time difference in the passage of the opposite sides of the curved conduit through points near the mid-plane of oscillation;

whereby the magnitude of the time delay between the sensor outputs representing the time difference in passage through the mid-plane of oscillation is a measure of the mass flow rate through the curved conduit.

2. An improved sensor means as set forth in claim 1 in which the sensors in each pair are the same and are selected from the group consisting of position sensors, acceleration sensors, and velocity sensors.

3. An improved sensor means as set forth in claim 1 in which the sensors are velocity sensors.

4. An improved sensor means as set forth in claim 3 in which the velocity sensors each comprise a coil and a magnet defining a gap therebetween and adapted to move relative to each other, one of the coil and magnet being statically mounted and the other of the coil and magnet being mounted to the curved conduit.

5. An improved sensor means as set forth in claim 4 in which the coil and magnet sensors are mounted symmetrically about an axis located equidistant between the legs of the curved conduit, about which Coriolis force-induced deflection occurs under conditions of fluid flow through the conduit.

6. An improved sensor means as set forth in claim 4 in which each coil is wound on a rectangular bobbin and its parallel end portions are located within the uniform magnetic flux fields of the two pole faces of the adjacent magnet such that relative motion of the magnet and coil with respect to each other produces a linear electrical signal corresponding to the velocity of such motion.

7. An improved sensor means as set forth in claim 4 in which each coil is wound on a rectangular bobbin and one of the parallel end portions is located within the uniform magnetic flux field of one of the pole faces of the adjacent magnet, such that the relative motion of the magnet and coil produces a linear electrical signal corresponding to the velocity of such motion.

8. An improved sensor means as set forth in claim 1 in which the means to electronically detect the time delay between the analog sensor signals corresponding to the time difference in the passage of the opposite sides of the curved conduit through points near the mid-plane of oscillation comprises:

(a) means for generating a square wave as a function of the signal output of the sensor mounted on a side leg of said conduit, with the vertical portions of said square wave being positioned in time coincident with that of said sensor signal corresponding to a set electrical reference; and, (b) means for setting said electrical reference for each sensor at substantially the same but sufficiently different electrical magnitudes from that of the electrical signals generated by each sensor when the sides of the oscillating conduit pass through the mid-plane of oscillation so that the first vertical portion of the square wave as generated by the output of a selected sensor always precedes the first vertical portion of the square wave as generated by the output of the other sensor;

whereby time differences between the corresponding vertical portions of the resulting square waves for sensor pairs each located on opposite sides of the curved conduit are detectable by the meter readout means in the form of time delays.

9. An improved sensor means as set forth in claim 1 in which the output signal of each sensor is connected to integrating means including at least one stage of signal integration to provide isolation from external vibrations, the integration output is further connected to low frequency filter means adapted to separate electrical drift and low frequency components of the integrator output from the conduit oscillating frequency components of such signal, and the associated circuitry includes means to feedback these components of the signal in negative quantities to the integrator input to cancel such components from the output of the integrator, thereby electronically averaging the sensor signals to eliminate low frequency conduit motions and electrical drift as sources of error in the time delay measurement.

10. An improved sensor means as set forth in claim 1 for which the curved conduit, on which the sensors are fixedly mounted, is oscillated out of phase with a spring arm that (a) is mounted adjacent both the support, and the inlet and outlet ends of the conduit; and (b) has substantially the same resonant frequency as the conduit.

11. In a Coriolis force meter comprising;

a continuous curved conduit having substantially symmetrical leg portions joined by a connecting yoke portion, which curved conduit is solidly supported at the open ends of the leg portions thereof for resilient oscillation of the connecting yoke portion thereof around an oscillation axis which substantially passes through both leg mounting positions;

means to oscillate the curved conduit; and means to measure mass flow rate as a function of deflection of the curved conduit around a Coriolis deflection axis positioned symmetrically between the legs of the curved conduit and perpendicular to the oscillation axis, by determining the time delays between passage of the opposite sides of the curved conduit through predetermined planes adjacent the mid-plane of oscillation in both directions of oscillation;

the improvement comprising improved sensor means including a pair of sensors supported at least in part by the curved conduit at positions spaced symmetrically on either side of the deflection axis, the sensors each being adapted to generate an analog signal as a linear function of the oscillatory movement of the curved conduit at the position of the sensor; and means to identify the time at which each sensor signal corresponds to movement of the curved conduit through a plane adjacent the mid-plane of oscillation of the curved conduit during each oscillation thereof;

whereby the mass flow rate may be accurately determined as a function of the measured time delays between the identified portions of the sensor signals.

12. Improved sensor means as set forth in claim 11 in which the predetermined planes are located on opposite sides of the mid-plane of oscillation at approximately but not exactly the same location as the mid-plane of oscillation, and the difference in location between the predetermined planes and the mid-plane of oscillation is such that the time at which one of the two sensors generates a signal corresponding to passage of the predetermined plane set for that sensor is prior to the corresponding time of the other sensor generating a signal corresponding to passage of the predetermined plane set for that sensor during oscillation in a given direction.

13. Improved sensor means as set forth in claim 11 in which the sensors are the same and are selected from the group consisting of position sensors, acceleration sensors, and velocity sensors.

14. Improved sensor means as set forth in claim 13 in which the sensors are velocity sensors.

15. Improved sensor means as set forth in claim 14 in which the velocity sensors each comprise a coil and a magnet defining a gap therebetween and adapted to move relative to each other, one of the coil and magnet being statically mounted and the other of the coil and magnet being mounted to the curved conduit, with the coil and magnet of each sensor being mounted symmetrically about the Coriolis deflection axis of the curved conduit.

16. An improved sensor means as set forth in claim 15 in which each coil is wound on a rectangular bobbin and its parallel end portions are located within the uniform magnetic flux fields of the two pole faces of the adjacent magnet such that relative motion of the magnet and coil with respect to each other produces a linear electrical signal corresponding to the velocity of such motion.

17. An improved sensor means as set forth in claim 15 in which each coil is wound on a rectangular bobbin and one of the parallel end portions is located within the uniform magnetic flux fields of one of the pole faces of the adjacent magnet such that relative motion of the magnet and coil produces a linear electrical signal corresponding to the velocity of such motion.

18. Improved sensor means as set forth in claim 11 in which the means to identify the time at which a sensor corresponds to movement of the curved conduit through a plane adjacent the mid-plane of oscillation comprises a comparator adapted to receive the sensor signal and switch at a predetermined electrical reference to output a square wave with the vertical portions of the square wave coincident in time with the movement of the curved conduit through the plane adjacent the mid-plane of oscillation.

19. Improved sensor means as set forth in claim 18 in which the electric reference connected to the comparator receiving the signal from one sensor differs from the electric reference connected to the comparator receiving the output signal from the other sensor a sufficient increment to always switch one comparator prior to the other comparator during oscillation of the curved conduit in a given direction.

20. An improved sensor means as set forth in claim 11 in which the output signal of each sensor is connected to integrating means including at least one stage of signal integration to provide isolation from external vibrations, the integration output is further connected to low frequency filter means adapted to separate electrical drift and low frequency components of the integrator output from the conduit oscillating frequency components of such signal, and the associated circuitry includes means to feedback these components of the signal in negative quantities to the integrator input to cancel such components from the output of the integrator, thereby electronically averaging the sensor signals to eliminate low frequency conduit motions and electrical drift as sources of error in the time delay measurement.

21. An improved method as set forth in claim 20 in which each signal is integrated at least once to provide isolation from external vibrations and the integrator output is connected to a low frequency filter adapted to separate and feedback in negative quantities to the integrator input the electrical drift and low frequency components of the integrator output from the conduit oscillating frequency components of such signal so that such components are cancelled from the output of the integrator.

22. In a method for measuring Coriolis forces by resiliently oscillating a continuous curved conduit which is mounted to a support at the open ends of the conduit about an axis passing substantially through the mounting position and determining mass flow rate as a function of the time delay between the passage of one side leg of the curved conduit through a predetermined position relative to the oscillation of the conduit and the passage of the other side leg of the curved conduit through a corresponding predetermined position, the improvement which comprises:

generating analog signals which are linear functions of the actual movement of the curved conduit at symmetrical positions on either side of the curved conduit; and determining the time delay between the signals which corresponds to the time delay of the side legs of the curved conduit passing through the predetermined positions;

whereby mass flow rate may be determined by readout means as a function of such time delay.

23. An improved method as set forth in claim 22 in which the predetermined positions of the oscillation of the curved conduit are approximately but not exactly at the mid-plane of oscillation of each side leg of the curved conduit, and the difference in location between the predetermined positions and the mid-plane of oscillation is such that the time at which one side of the curved conduit generates a signal corresponding to passage of the predetermined position set for that side of the curved conduit is prior to the corresponding time of the other side of the curved conduit generating a signal corresponding to passage of the predetermined position set for that side of the curved conduit.

24. An improved method as set forth in claim 22 in which each signal is initially generated substantially in the form of an oscillating signal corresponding to the actual movement of the curved conduit at the location of each sensor, and in which a neutral position for such signals is determined by electronically averaging each signal over a plurality of oscillation cycles.

25. An improved method as set forth in claim 22 in which each signal is one of the group consisting of position, velocity and acceleration signals of the curved conduit.

26. An improved method as set forth in claim 25 in which each signal is a velocity signal.

27. An improved method as set forth in claim 22 in which each signal is connected to a low frequency filter adapted to pass only the low frequency portions of the signal, and in which such low frequency portions are fed back to the initial signal to cancel low frequency components from the signal.

* * * * *

UNITED STATES PATENT AND TRADEMARK OFFICE
CERTIFICATE OF CORRECTION

PATENT NO. : 4,422,338
DATED : December 27, 1983
INVENTOR(S) : James E. Smith

It is certified that error appears in the above-identified patent and that said Letters Patent is hereby corrected as shown below:

Column 1, line 58, "changqs" should read --changes--.

Column 6, line 3, "biased on the" should read --biased to the--

Signed and Sealed this

First Day of May 1984

[SEAL]

Attest:

GERALD J. MOSSINGHOFF

Attesting Officer   Commissioner of Patents and Trademarks

REEXAMINATION CERTIFICATE (728th)
United States Patent [19]
Smith

[11] B1 4,422,338

[45] Certificate Issued   Jul. 14, 1987

[54] METHOD AND APPARATUS FOR MASS FLOW MEASUREMENT

[75] Inventor: James E. Smith, Boulder, Colo.

[73] Assignee: Micro Motion, Inc., Boulder, Colo.

Reexamination Reqs:st:
No. 90/001,103, Oct. 1, 1986
No. 90/001,115, Oct. 14, 1986
No. 90/001,149, Jan. 13, 1987

Reexamination Certificate for:
Patent No.: 4,422,338
Issued: Dec. 27, 1983
Appl. No.: 280,297
Filed: Jul. 6, 1981

Certificate of Correction issued May 1, 1984.

Related U.S. Application Data

[63] Continuation-in-part of Ser. No. 235,268, Feb. 17, 1981, abandoned.

[51] Int. Cl.$^4$ ............................................. G01F 1/84
[52] U.S. Cl. ............................................. 73/861.38
[58] Field of Search ................... 73/861.37, 861.38

[56] References Cited

U.S. PATENT DOCUMENTS

| | | |
|---|---|---|
| 2,865,201 | 12/1958 | Roth . |
| 2,943,487 | 7/1960 | Potter ................................. 73/231 |
| 3,002,384 | 10/1961 | MacDonald et al. ............... 73/231 |
| 3,087,325 | 4/1963 | Roth . |
| 3,108,475 | 10/1963 | Henderson . |
| 3,132,512 | 5/1964 | Roth . |
| 3,164,017 | 1/1965 | Karlby et al. ........................ 73/194 |
| 3,232,110 | 1/1962 | Li ......................................... 73/231 |
| 3,276,257 | 10/1966 | Roth . |
| 3,276,258 | 10/1966 | Rowley ............................... 73/194 |
| 3,329,019 | 7/1967 | Sipin ................................... 73/194 |
| 3,344,666 | 10/1967 | Rilett .................................. 73/231 |
| 3,355,944 | 12/1967 | Sipin . |
| 3,403,555 | 10/1968 | Versaci et al. ..................... 73/194 |
| 3,426,593 | 2/1969 | Jacobs ................................ 73/194 |
| 3,465,586 | 9/1969 | Johnston ............................. 73/228 |
| 3,485,098 | 12/1969 | Sipin . |
| 3,575,052 | 4/1971 | Lenker ............................... 73/231 |
| 3,579,104 | 5/1971 | Pignard et al. .................... 324/830 |
| 3,608,374 | 9/1971 | Miller .............................. 73/194 B |
| 3,671,876 | 6/1972 | Oshiro ................................ 328/134 |
| 3,877,304 | 4/1975 | Vetsch ........................... 73/231 M |
| 4,127,028 | 11/1978 | Cox et al. ........................ 73/194 B |
| 4,187,721 | 2/1980 | Smith ............................ 73/861.38 |
| 4,192,184 | 3/1980 | Cox et al. ....................... 73/861.38 |
| 4,311,054 | 6/1982 | Cox et al. ....................... 73/861.38 |
| 4,381,680 | 5/1983 | Shiota ............................. 73/861.38 |

FOREIGN PATENT DOCUMENTS

WO86/00699  1/1986  PCT Int'l Appl. ............... 861.38/

OTHER PUBLICATIONS

Bulman (Ohio Semitronics, Inc.), "Applications Of The Hall Effect", Solid State Electronics, vol. 9, pp. 361–372 (1966).
1978 Product Brochure on Hall Effect Sensors of Ohio Semitronics, Inc., Catalogue Brochure No. EEM/078/-2OM.
1980 Product Brochure on Hall Effect Sensors of Ohio Semitronics, Inc., Catalogue Brochure No. 880.
Micro Motion Inc. Instruction Manual–Model B Mass Flow Meter.
Halliday et al., "Physics for Student of Science and Education" by Wiley and Sons Inc. 1962.
Heydemann, On the Precise Measurement of Phase Angles, Acustica 13, pp. 421–426, 1963.
McKinney, Digitized Low Frequency Phasemeter Assembled from Logic Modules, J. Research, Natl. Bur. Stds, vol. 71C, pp. 227–238, Jul.–Sep. 1967.
Halsell, Charles, M., Mass Flowmeters, ISA, Journal, vol. 7, No. 6, pp. 49–62 (1960).
Green, Derrick, Resonance Frequency: Measurement Tool of the Seventies, Control & Instrumentation, pp. 40–43 (Feb. 1975).
Sipin Co., Anatole, Jr., Vibratory Sewer Flow Meter, Contract 14–12 907.

*Primary Examiner*—Herbert Goldstein

[57] ABSTRACT

Apparatus and method for making fluid mass flow rate measurements using a Coriolis flow meter equipped with sensors which measure acceleration, velocity, or position of each side leg of an oscillating U-shaped conduit through which the fluid is passed. The sensors are so constructed and located as to produce analog signal outputs which accurately correspond to the motion of the respective side legs of the U-shaped conduit. When fluid is flowing through the conduit, a change from coincidence in the time relationship of the sensor signals caused by the divergent oscillations of each side leg of the U-shaped conduit is measured in both directions of oscillation. The fluid mass flow rate is then determined as a function of such time separation of the signals. The separation of the two signals with respect to time is measured without reference to static structures affixed to a platform.

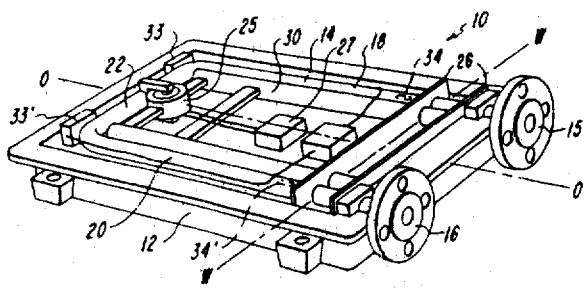

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–27 is confirmed.

* * * * *